United States Patent
Watanabe et al.

(10) Patent No.: US 8,645,130 B2
(45) Date of Patent: Feb. 4, 2014

(54) PROCESSING UNIT, SPEECH RECOGNITION APPARATUS, SPEECH RECOGNITION SYSTEM, SPEECH RECOGNITION METHOD, STORAGE MEDIUM STORING SPEECH RECOGNITION PROGRAM

(75) Inventors: Narimasa Watanabe, Aichi-gun (JP); Kiyohiro Shikano, Ikoma (JP); Randy Gomez, Kyoto (JP)

(73) Assignees: Toyota Jidosha Kabushiki Kaisha, Toyota-Shi (JP); National University Corporation Nara Institute of Science and Technology, Ikoma-Shi (JP)

(*) Notice: Subject to any disclaimer, the term of this patent is extended or adjusted under 35 U.S.C. 154(b) by 669 days.

(21) Appl. No.: 12/274,944

(22) Filed: Nov. 20, 2008

(65) Prior Publication Data

US 2009/0281804 A1    Nov. 12, 2009

(30) Foreign Application Priority Data

May 8, 2008  (JP) .................................. 2008-122288

(51) Int. Cl.
*G10L 15/00*    (2013.01)
(52) U.S. Cl.
USPC ........... 704/231; 704/235; 704/251; 704/243; 704/250; 704/255
(58) Field of Classification Search
USPC .................. 704/231, 235, 251, 255, 243, 250
See application file for complete search history.

(56) References Cited

U.S. PATENT DOCUMENTS

| | | | |
|---|---|---|---|
| 2004/0213415 A1* | 10/2004 | Rama et al. ...................... | 381/63 |
| 2006/0210089 A1* | 9/2006 | Tashev et al. ................... | 381/66 |
| 2008/0292108 A1* | 11/2008 | Buck et al. ...................... | 381/63 |
| 2008/0300869 A1* | 12/2008 | Derkx et al. .................. | 704/226 |

FOREIGN PATENT DOCUMENTS

| | | |
|---|---|---|
| JP | 2006-003617 A | 1/2006 |
| JP | 2006-072052 A | 3/2006 |
| JP | 2006-072127 A | 3/2006 |
| JP | 2006-234888 A | 9/2006 |
| JP | 2007-065204 A | 3/2007 |

OTHER PUBLICATIONS

Habets,'multi-channel speech dereverberation based on a statistical model of late reverberation', IEEE, ICASSP, 2005.*
Kinoshita et al., "spectral subtraction steered by multi-step forward linear prediction for signal channel speech dereverberation", IEEE, ICASSP, 2006.*

* cited by examiner

*Primary Examiner* — Qi Han
(74) *Attorney, Agent, or Firm* — Kenyon & Kenyon LLP

(57) ABSTRACT

A processing unit is provided which executes speech recognition on speech signals captured by a microphone for capturing sounds uttered in an environment. The processing unit has: an initial reflection component extraction portion that extracts initial reflection components by removing diffuse reverberation components from a reverberation pattern of an impulse response generated in the environment; and an acoustic model learning portion that learns an acoustic model for the speech recognition by reflecting the initial reflection components to speech data for learning.

12 Claims, 7 Drawing Sheets

PROCESSING UNIT, SPEECH RECOGNITION APPARATUS, SPEECH RECOGNITION SYSTEM, SPEECH RECOGNITION METHOD, STORAGE MEDIUM STORING SPEECH RECOGNITION PROGRAM

INCORPORATION BY REFERENCE

The disclosure of Japanese Patent Application No. 2008-122288 filed on May 8, 2008 including the specification, drawings and abstract is incorporated herein by reference in its entirety.

BACKGROUND OF THE INVENTION

1. Field of the Invention

The invention relates to a processing unit, a speech recognition apparatus, a speech recognition system, a speech recognition method, and a storage medium storing a speech recognition program.

2. Description of the Related Art

Japanese Patent Application Publications No. 2006-72127 (JP-A-2006-72127) and No. 2006-03617 (JP-A-2006-03617) each describe a speech recognition apparatus that captures speech signals uttered by a user and then performs speech recognition on the captured speech signals. According to such a speech recognition apparatus, for example, the speech of the speaker is captured by a microphone (e.g., hand-free microphone), and then speech recognition is performed on the speech signals captured by the microphone.

In a case where the speech of a speaker is captured by a microphone such as a hand-free microphone, the speech signals may be influenced by the shape of the room, the shapes around the microphone, and so on. For example, the microphone captures both the sounds (voices) uttered by the speaker and the sounds reflected by walls, etc. Therefore, the reflected sounds are unavoidably captured as reverberations, and they reduce the speech recognition rate. Because such reverberations come from the voices of the speaker, it is quite difficult to remove the influences of the reverberations. Japanese Patent Application Publication No. 2007-65204 (JP-A-2007-65204) describes a method for removing reflection waves reflected by walls, and the like. This method, however, essentially requires a plurality of microphones.

Japanese Patent Application Publications No. 2006-72052 (JP-A-2006-72052) and No. 2006-23488 (JP-A-2006-23488) describe technologies for removing the influences of reverberations to improve the speech recognition rate. According to the reverberation removal methods described in these publications, an inverse filter for removing the influences of reverberation components is estimated. Further, in the reverberation removal method described in JP-A-2006-72052, the captured signals are classified into direct sounds, initial reflection components, and later reverberation components. According to this publication, the initial reflection components are correlative with the direct sounds, and the later reverberation components are correlative with neither the direct sounds nor the initial reflection components.

According to the reverberation removal methods described above, an inverse filter is estimated based on the input acoustic signals, and inverse-filtering is performed, using the inverse filter, on the acoustic signals that are frequency-domain signals. Further, the frequency-domain output signals obtained through the inverse-filtering are then transformed into time-domain signals.

According to the reverberation removal methods described in JP-A-2006-72052 and JP-A-2006-234888, because the inverse filter is estimated for the input acoustic signals, the above-described processes need to be executed in real time. However, such real-time execution is difficult due to an enormous amount of data to be processed, and therefore it is difficult to achieve a high speech recognition rate in the reverberation influence removal methods described above.

SUMMARY OF THE INVENTION

The invention provides a processing unit, a speech recognition apparatus, a speech recognition system, a speech recognition method, and a storage medium storing a speech recognition program, which improve the speech recognition rate.

The first aspect of the invention relates to a processing unit that executes processing for speech recognition. The processing unit has: an initial reflection component extraction portion that extracts initial reflection components by removing diffuse reverberation components from a reverberation pattern of an impulse response generated in an environment; and an acoustic model learning portion that learns an acoustic model for the speech recognition by reflecting the initial reflection components to speech data for learning. According to the processing unit of the first aspect of the invention, because the initial reflection components are reflected to the learning of the acoustic model, the acoustic model is more appropriate for speech recognition, and this improves the speech recognition rate.

The second aspect of the invention relates to a speech recognition apparatus that performs speech recognition on speech signals captured by a microphone for capturing sounds uttered in an environment. The speech recognition apparatus has: a spectrum transformation portion that transforms the speech signals captured by the microphone into spectrum data; and a recognition portion that recognizes speeches from characteristic quantities corresponding to the spectrum data using an acoustic model changed by initial reflection components that are obtained by removing diffuse reverberation components from a reverberation pattern of an impulse response generated in the environment. According to the speech recognition apparatus of the second aspect of the invention, speech recognition is performed using the acoustic model changed by the initial reflection components, and this improves the speech recognition rate.

The second aspect of the invention relates to a speech recognition system that has a microphone for capturing sounds uttered in an environment and performs speech recognition on speech signals captured by the microphone. The speech recognition system has: a spectrum transformation portion that transforms the speech signals captured by the microphone into spectrum data; and a recognition portion that recognizes speeches from characteristic quantities corresponding to the spectrum data using an acoustic model changed by initial reflection components that are obtained by removing diffuse reverberation components from a reverberation pattern of an impulse response generated in the environment. According to the speech recognition system of the third aspect of the invention, because the initial reflection components are reflected to the acoustic model, the acoustic model is more appropriate for speech recognition, and this improves the speech recognition rate.

The fourth aspect of the invention relates to a speech recognition method for performing speech recognition on speech signals captured by a microphone for capturing sounds uttered in an environment. The speech recognition method includes: extracting initial reflection components by removing diffuse reverberation components from a reverberation pattern of an impulse response generated in the environment; and learning an acoustic model for the speech recognition by reflecting the initial reflection components to speech data for learning. According to the speech recognition method of the fourth aspect of the invention, because the initial reflection components are reflected to the acoustic model, the acoustic model is more appropriate for speech recognition, and this improves the speech recognition rate.

The fifth aspect of the invention relate to a storage medium storing a speech recognition program for performing speech recognition on speech signals captured by a microphone for capturing sounds uttered in an environment. The storage medium stores: an instruction for causing a computer to capture a reference sound uttered in the environment and extract initial reflection components from a reverberation pattern of the reference sound; and an instruction for causing the computer to learn an acoustic model for the speech recognition by reflecting the initial reflection components to speech data for learning.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
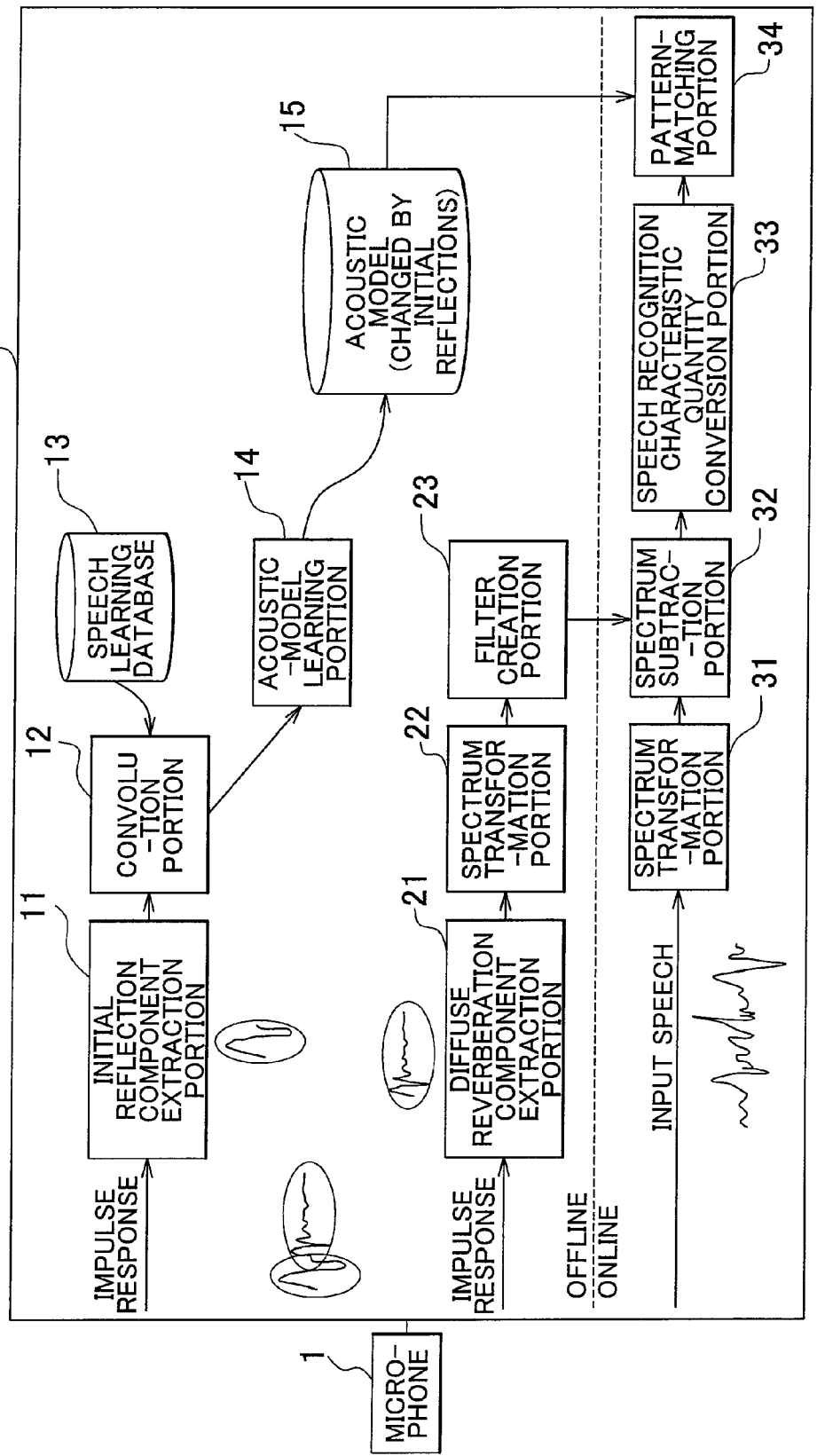
FIG. 1 is a view schematically showing the configuration of a speech recognition system according to an example embodiment of the invention.

A speech recognition system according to an example embodiment of the invention will be described with reference to FIG. 1. FIG. 1 is a block diagram illustrating the configuration of the speech recognition system. The speech recognition system is provided with a microphone 1 and a speech recognition device 2.

The microphone 1 is set in an environment and captures the sounds uttered in the environment. Thus, the microphone 1 collects the voices uttered by a speaker and outputs speech signals corresponding to the collected voices to the speech recognition device 2. For example, the microphone 1 is set in a room of a building. The microphone 1 is set at a predetermined position in the environment.

The speech recognition device 2 executes speech-data processing on the speech signals output from the microphone 1. The speech recognition device 2 is a processing unit constituted of a CPU (Central Processing Unit), a ROM (Read Only Memory), a RAM (Random Access Memory), communication interfaces, and so on. The speech recognition device 2 executes various processing necessary for speech recognition. The speech recognition device 2 incorporates an auxiliary data storage (e.g., detachable hard drive, optical disk drive, magneto-optical disk drive) storing various programs and control parameters that are read into a memory (not shown in the drawings) as needed. For example, the speech recognition device 2 converts the signals from the microphone 1 into digital signals and performs data processing with the digital signals. That is, various programs for speech recognition are stored in the speech recognition device 2, and the speech recognition device 2 executes various processing on digital signals on the programs.

The speech recognition device 2 incorporates an initial reflection component extraction portion 11, a convolution portion 12, a speech learning database 13, an acoustic-model learning portion 14, an acoustic model 15, a diffuse reverberation component extraction portion 21, a spectrum transformation portion 22, a filter creation portion 23, a spectrum transformation portion 31, a spectrum subtraction portion 32, a speech recognition characteristic quantity conversion portion 33, and a pattern-matching portion 34.

The initial reflection component extraction portion 11, the convolution portion 12, the speech learning database 13, and the acoustic-model learning portion 14 execute processes for creating the acoustic model 15 used for speech recognition. As such, the created acoustic model 15 is changed by the initial reflection components of the reverberation pattern of the speech signals. Note that the acoustic model 15 is a hidden Markov model (HMM). This process is executed offline in advance. That is, the acoustic model 15 is created prior to detecting speech signals to be recognized.

The diffuse reverberation component extraction portion 21, the spectrum transformation portion 22, and the filter creation portion 23 execute processes for removing diffuse reverberation components. Through these processes, a subtraction filter for subtracting diffuse reverberation components is created. The processes are executed offline in advance. That is, the subtraction filter is created prior to detecting speech signals to be recognized.

The spectrum transformation portion 31, the spectrum subtraction portion 32, the speech recognition characteristic quantity conversion portion 33, and the pattern-matching portion 34 execute speech recognition processes on the input speeches. These processes are executed using the subtraction filter and the acoustic model 15. Speeches are continuously recognized as the speech recognition processes are executed online (in real-time) on the input speeches.

Figure 2:
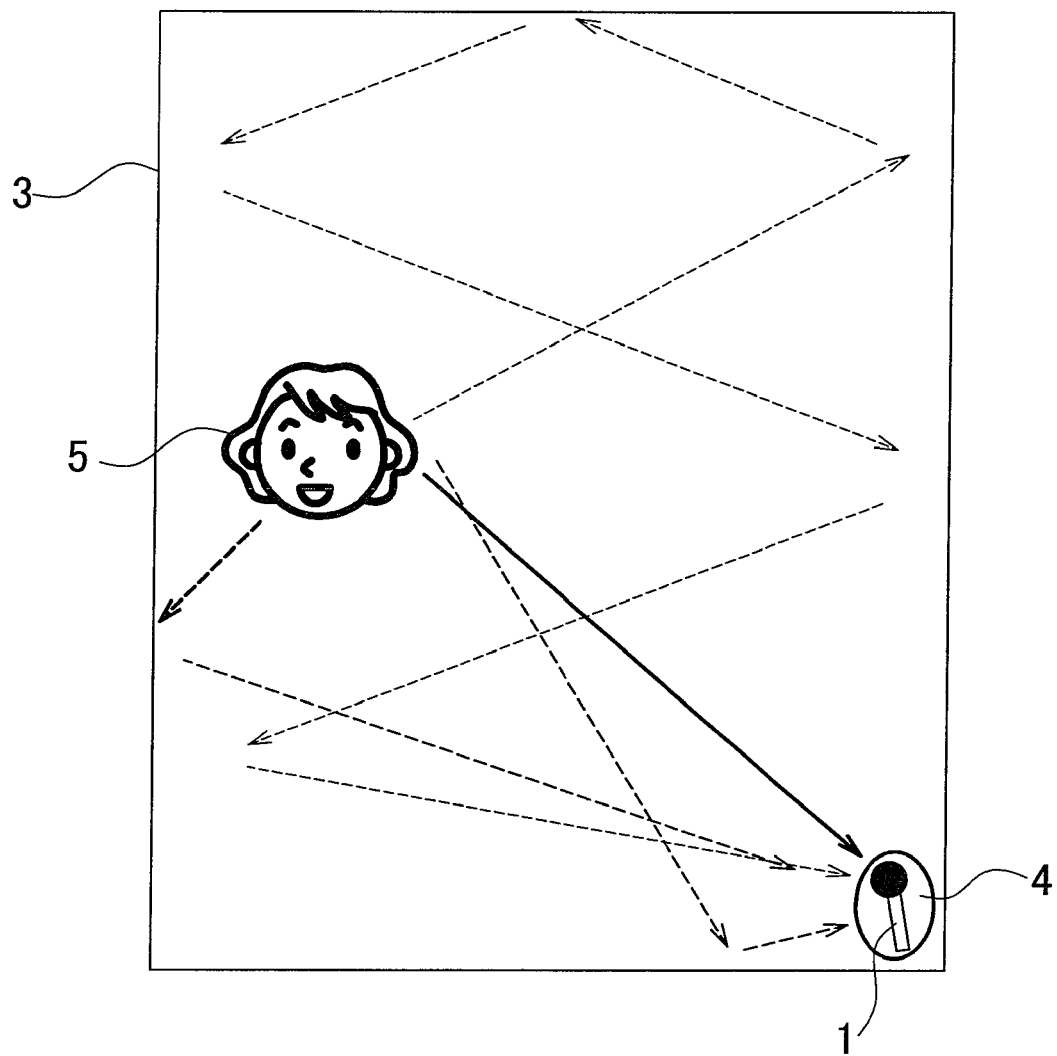
FIG. 2 is a view illustrating reflection of sounds uttered in an environment.
Figure 3:
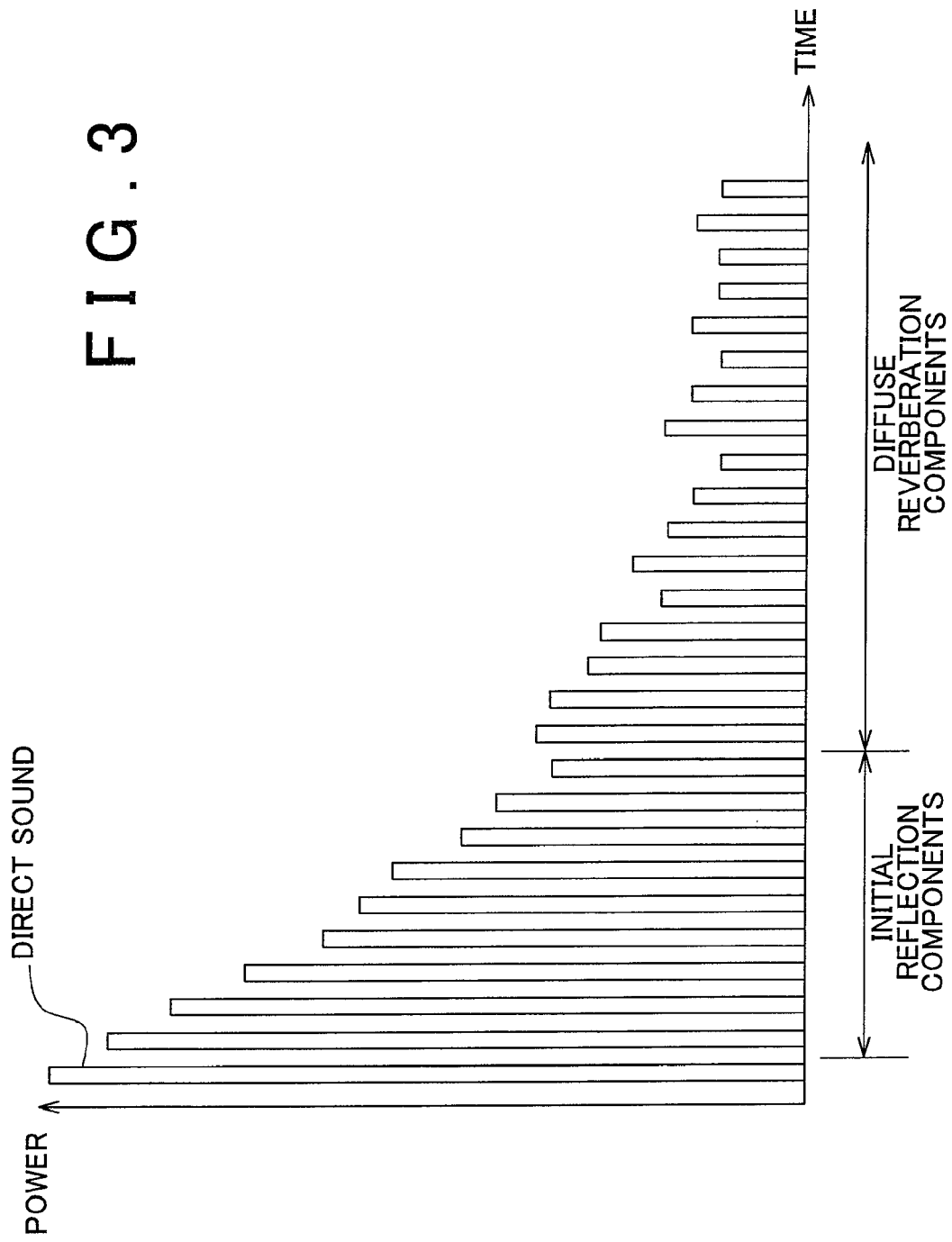
FIG. 3 is a graph schematically illustrating speech signals captured by the speech recognition system of the example embodiment of the invention.

In the following, the initial reflection components and the diffuse reverberation components included in a reverberation pattern will be described with reference to FIG. 2 and FIG. 3. FIG. 2 schematically illustrates how the sounds uttered in a room are reflected. The graph of FIG. 3 represents examples of signals captured by the microphone 1 set in an environment. The horizontal axis of the graph represents time, and the vertical axis represents the power of signals. FIG. 3 discretely represents the waveforms of the signals output as impulse responses.

FIG. 2 illustrates a case where the speech recognition system shown in FIG. 2 is incorporated in a robot 4. Referring to FIG. 2, sounds uttered by a speaker 5 in the room reach the microphone 1 of the robot 4 and are then captured thereby. Some sounds directly travel to the microphone 1 while some sounds travel to the microphone 1 through reflections at walls 3. Note that sounds are reflected by the ceiling, the floor, desks, and so on, as well as by the walls 3. The sounds directly traveling to the microphone 1 and the sounds traveling to the microphone 1 through reflections at the wall 3 differ in the time they are captured by the microphone 1. Further, with regard to the sounds reaching the microphone 1 through reflections, the larger the number of reflections, the later the time the sounds reach the microphone 1. As such, the time at which the sounds are captured differs depending upon the distance the sounds travel, and the like. Note that sound reflections occur at the ceiling, the floor, desks, etc., in the room, as well as at the walls 3.

FIG. 3 illustrates the waveforms of signals captured when an impulse composed of a single pulse having a very short pulse width is uttered in the room illustrated in FIG. 2. With regard to the time response of the impulse, a direct sound that reaches the microphone 1 without being reflected by the walls 3 is first captured (t=0), and then the sounds reflected by the walls 3 are captured. The reflected sounds are weaker than the direct sound because they are partially absorbed by the walls 3, and so on. As such, the repeatedly reflected sounds are captured sequentially.

At this time, the reverberation pattern of the impulse response is classified into initial reflection components and diffuse reverberation components. For doing so, first, reverberation components are extracted from the impulse response, and the extracted reverberation components are then classified into initial reflection components and diffuse reverberation components. More specifically, the components in the former half of the reverberation pattern are classified as initial reflection components, and the components in the latter half are classified as diffuse reverberation components. That is, the components after the initial reflection components are classified as the diffuse reverberation components. The initial reflection components include low-order reflection components, such as first-order reflection components and second-order reflection components. On the other hand, the diffuse reverberation components include high-order reflection components.

In this specification, the time border between the initial reflection components and the diffuse reverberation components is referred to as a decay time border. Thus, the components captured by the microphone 1 within the time period from the capturing of the direct sound to the decay time border are classified as the initial reflection components, and the components captured after the decay time border are classified as the diffuse reverberation components. For example, if the time border is set at 70 msec, the data obtained in 0-70 msec (excluding t=0 and t=70) are classified as the initial reflection components, and the data obtained after 70 msec are classified as the diffuse reverberation components.

The decay time border, which is the border between the initial reflection components and the diffuse reverberation components as mentioned above, is set in accordance with the analysis length of the acoustic model 15. For example, in a case where the analysis frame length is set to 25 msec, the frame shift is set to 10 msec, and the number of frames in one segment is set to five, the analysis length is 25+10×(5−1)=65 msec. That is, the analysis length is the length of one segment composed of a plurality of frames and frame shifts, and it is 65 msec in this example. In this case, based on the analysis length of 65 msec, the decay time border is set to, for example, 70 msec. Thus, the analysis length of the acoustic model 15 can be extended by retarding the decay time border, that is, by increasing the value of the decay time border, and the analysis length of the acoustic model 15 can be shortened by reducing the value of the decay time border. Setting the time width for classifying the initial reflection components according to the analysis length of the acoustic model 15 as described above improves the speech recognition rate. Note that the analysis length of the acoustic model 15 and the decay time border may be equal to each other. As such, the decay time border may be set in accordance with the analysis length of the acoustic model 15, which is a unit of learning with the acoustic model 15. By doing so, the components contained in the reverberation pattern of the impulse response can be properly classified into the initial reflection components and the diffuse reverberation components.

Through the processes described above, the initial reflection components and the diffuse reverberation components are extracted from the reverberation pattern of the impulse response. That is, the data obtained after the capturing of the direct sound are classified into the initial reflection components and the diffuse reverberation components with respect to the time decay border. That is, the initial reflection components are extracted by removing the diffuse reverberation components from the reverberation pattern of the impulse response, while the diffuse reverberation are extracted by removing the initial reflection components from the reverberation pattern of the impulse response.

The initial reflection components and the diffuse reverberation components, which have been extracted as described above, are used for speech recognition in the speech recognition device 2. That is, in this example embodiment of the invention, a high speech recognition rate can be achieved by performing the speech recognition while removing the influences of the initial reflection components and the diffuse reverberation components from the speech signals captured by the microphone 1. In this example embodiment, the speech recognition rate is improved by executing different processes to the initial reflection components and the diffuse reverberation components. The initial reflection components are used for learning of the acoustic model 15, while the diffuse reverberation components are used to create a subtraction filter used for subtracting spectrum components.

Figure 4:
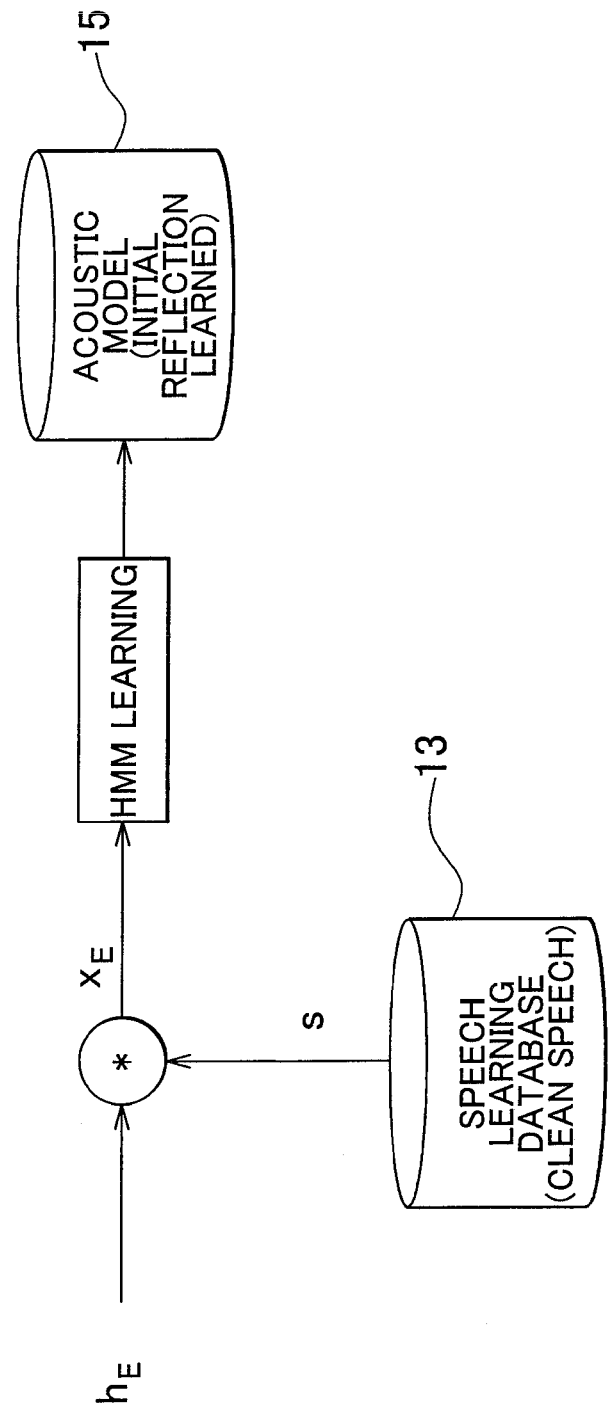
FIG. 4 is a view illustrating an acoustic model learning procedure executed in the speech recognition system of the example embodiment of the invention.

Next, the learning of the acoustic model 15 using the initial reflection components will be described with reference to FIG. 1 and FIG. 4. FIG. 4 illustrates the procedure for learning the acoustic model 15. This procedure is executed offline. That is, the acoustic model 15 is created through the procedure illustrated in FIG. 4 prior to capturing the speech signals to be recognized.

As shown in FIG. 1, the initial reflection component extraction portion 11 extracts the initial reflection components by removing the diffuse reverberation components from the impulse response. That is, among the reverberation components of the impulse response, those obtained before the decay time border are extracted as the initial reflection components. Referring to FIG. 4, the initial reflection components thus extracted are denoted as $h_E$. The convolution portion 12 of FIG. 1 executes a convolution process using the initial reflection components $h_E$.

Clean speech data for learning is stored in the speech learning database 13. For example, the clean speech data includes speech data for each phoneme. The clean speech data is captured in a place free of noises and reverberations. For example, a corpus is created from conversation of one hour, and labels, such as "a" and "i", are attached to the respective phonemes included in the corpus. As such, clean speech data for each phoneme is stored in the speech learning database 13. The convolution portion 12 convolves the initial reflection components $h_E$ to the clear speech data s stored in the speech learning database 13, whereby convolved data $x_E$ changed by the initial reflection components $h_E$ is obtained. That is, by convolving the initial reflection components $h_E$ to the respective phonemes contained in the clean speech data s, the convolved data $x_E$ is obtained for each phoneme.

Then, the acoustic-model learning portion 14 executes an acoustic model learning procedure based on the convolved data $x_E$ changed by the initial reflection components. If the acoustic model 15 is an HMM, the acoustic-model learning portion 14 performs HMM learning. More specifically, characteristic quantities are extracted from the convolved data $x_E$. More specifically, the characteristic quantities of the respective phonemes are recorded as a database. That is, a template model is created from the vector of the characteristic quantities of the respective phonemes. Such a characteristic-quantity vector is extracted for each analysis length, for example.

More specifically, the convolved data $x_E$ is transformed into spectrum data by FFT (Fast Fourier Transformation), or the like. Then, the spectrum data is transformed into time data through logarithmic conversion using a filter based on human auditory characteristics and then through IFFT (Inversed Fast Fourier Transformation). As such, a mel-cepstral is obtained. In a mel-cepstral space, spectrum envelopes occur in low orders, and slight vibrations occur in high orders. Then, a mel-frequency cepstrum coefficient (MFCC) is calculated by removing the low-order portions. In this example embodiment, a 12th order MFCC is calculated. Further, their first-order differences and the first-order differences of power are extracted as characteristic quantities. In this case, the characteristic-quantity vector is of 25th order (12+12+1). Note that the procedure for obtaining the characteristic quantities is not limited to the above procedure.

Then, learning is performed using the MFCC data group. Because the above-described processes are executed on a large amount of the speech data s contained in the corpus, the characteristic quantity for each phoneme has an average and a variance, and the acoustic model 15 includes these average values and variance values. Then, the acoustic-model learning portion 14 sets the state transition probability and the output probability of the HMM, and so on, in accordance with the average and variance of each characteristic quantity. For example, the acoustic-model learning portion 14 performs HMM learning using an expectation-maximization (EM) algorithm. Note that, if appropriate, any other algorithm may be used in place of the EM algorithm. This is how the acoustic model 15 is learned.

The acoustic model 15 learned in the acoustic-model learning portion 14 is recorded as a database. Through such learning, the acoustic model 15 is changed by the initial reflections. That is, the initial reflection components are modeled (estimated) through HMM. Thus, the acoustic model 15 factoring in the initial reflection components through learning is obtained. Using the acoustic model 15 thus obtained, the influences of the initial reflection components contained in the speech signals can be reduced, and as a result, a high speech recognition rate can be achieved.

Figure 5:
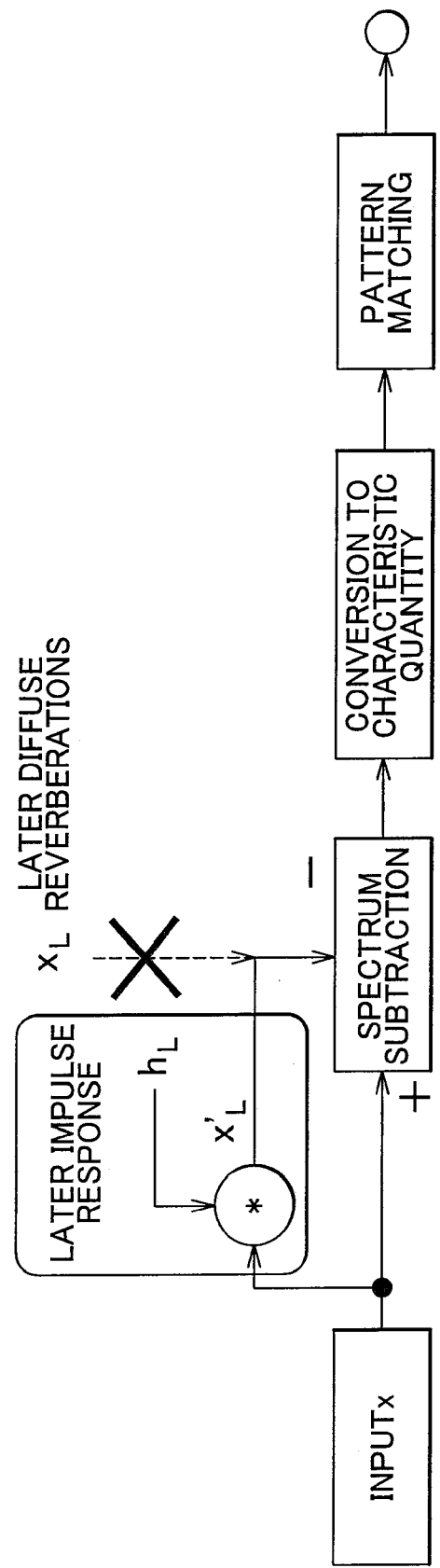
FIG. 5 is a view illustrating approximate calculations in a filter creation procedure executed in the speech recognition system of the example embodiment of the invention.
Figure 6:
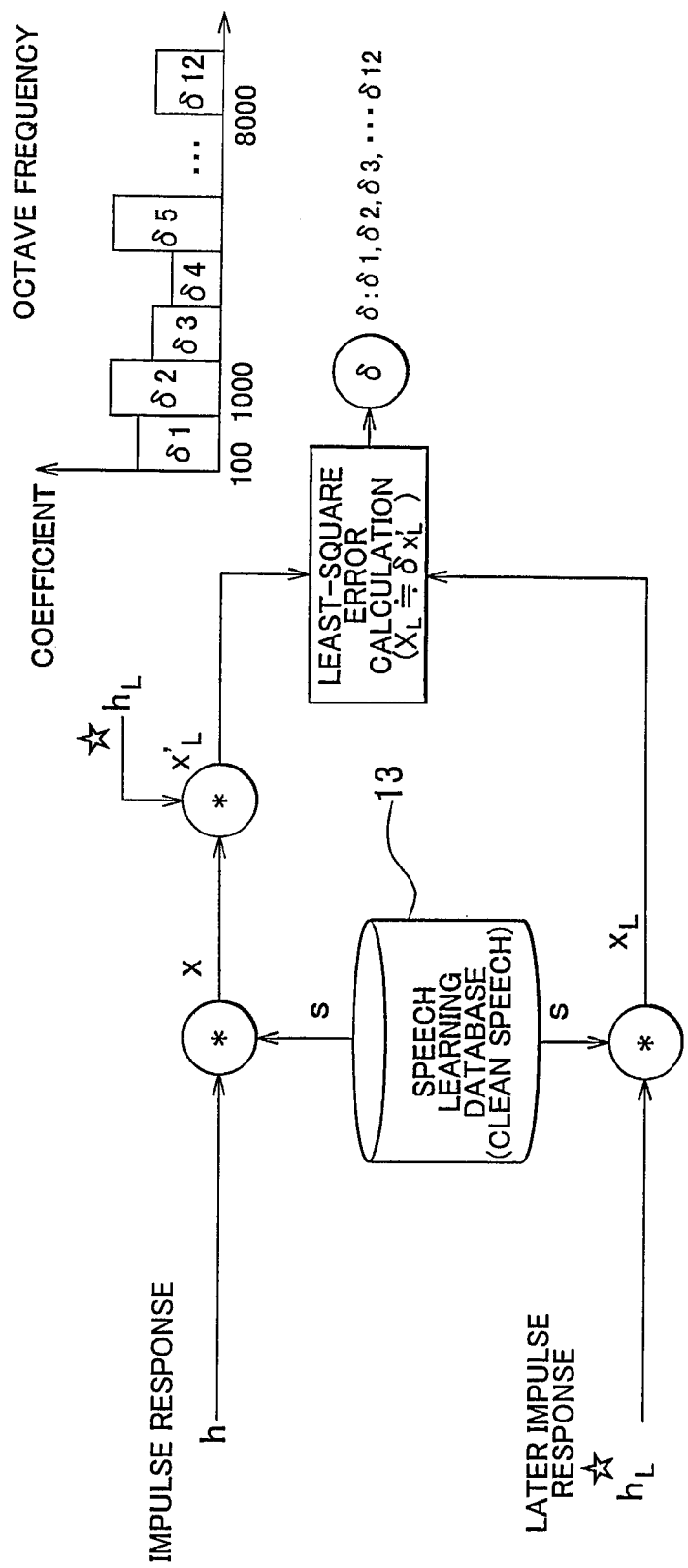
FIG. 6 is a view illustrating the filter creation procedure executed in the speech recognition system of the example embodiment of the invention.

Next, the procedure for creating a filter using the diffuse reverberation components will be described with reference to FIG. 1, FIG. 5, and FIG. 6. FIG. 5 conceptually illustrates approximate calculations for creating a filter. FIG. 6 illustrates the procedure for creating said filter.

As shown in FIG. 1, the diffuse reverberation component extraction portion 21 executes a diffuse reverberation component extraction process to the impulse response. Through this process, the diffuse reverberation components are extracted by removing the initial reflection components from the reverberation pattern of the impulse response. That is, among the reverberation components of the impulse response captured by the microphone 1, those obtained after the decay time border are classified as the diffuse reverberation components. The spectrum transformation portion 22 transforms the time data of the impulse response into spectrum data. More specifically, the spectrum transformation portion 22 transforms the time-domain data of the diffuse reverberation components into frequency-domain data. At this time, the spectrum transformation portion 22 performs said data transformation by Fourier transformation, for example. That is, the time-domain data is transformed into frequency-domain data by fast Fourier Transformation (FFT), for example. Note that the spectrum transformation portion 22 performs framing on the data based on the analysis length and the frame shift, which are mentioned earlier, before transforming it into spectrum data.

The filter creation portion 23 creates a subtraction filter for removing diffuse reverberations using the data of the diffuse reverberation components. First, the approximate calculations for creating the subtraction filter will be described with reference to FIG. 5. The procedure illustrated in FIG. 5 is an online procedure for speech recognition.

Referring to FIG. 5, the speech signal corresponding to the voice uttered by the speaker is obtained as an input x, and the diffuse reverberation components in its impulse response are obtained as a later impulse response $h_L$. Then, a spectrum subtraction is executed to remove later diffuse reverberations $x_L$ from the input x. After the spectrum subtraction, it is converted into a characteristic quantity, and speech recognition is performed through pattern matching.

However, it is impossible to directly observe the later diffuse reverberations $x_L$ in the input x. That is, it is impossible to observe the later diffuse reverberations XL only. For this reason, the later diffuse reverberations $x_L$ are approximated using the later impulse response $h_L$ that has been observed in advance. That is, if $x'_L$ ($=x*h_L$) can be approximated to $x_L$, the spectrum components of the diffuse reverberation components can be subtracted. Therefore, a filter for approximating the input x convolving the later impulse response to the later diffuse reverberation $x_L$ is created.

Next, an offline procedure for the above-described approximation will be described with reference to FIG. 6. In this procedure, an impulse response is measured, and a filter δ is created from the clean speech data s for learning. A later impulse response $h_L$ is convolved to the clean speech data s stored in the speech learning database 13, whereby a later diffuse reverberation $x_L$ is created. Meanwhile, an impulse response h is convolved to the clean speech data s stored in the speech learning database 13. That is, the entire impulse response h is convolved to the clean speech data s, whereby an input x corresponding to clean voices is created. Further, the later impulse response $h_L$ is convolved to the input x. That is, the impulse response h is convolved to the speech data s, and then the later impulse response $h_L$ is convolved to it. This later impulse response $h_L$ is identical to that convolved to the clean speech data.

The above-described process is performed on each speech data s stored in the speech learning database 13. Then, the filter δ for approximating the calculated later diffuse reverberation $x_L$ to $x'_L$ is estimated. That is, a coefficient for accomplishing $x_L \approx \delta x'_L$ is calculated. In this example embodiment, the filter δ is estimated through least-square error calculation. That is, the complementary error function of $x_L$ with $x'_L$ is minimized. As such, δ is calculated so as to make $\delta x'_L$ closest to XL. The appropriate value of this coefficient differs depending upon the frequency range. Therefore, the filter δ is estimated for each frequency range. As shown in the chart at the upper right of FIG. 6, appropriate coefficients for the respective frequency ranges are calculated. More specifically, a 12th-order filter δ (δ1, δ2, δ3, δ4, . . . δ12) is estimated.

Then, the spectrum subtraction is executed using the filter δ, whereby the diffuse reverberation components are removed from the speech signals. That is, the filter δ is a subtraction filter for subtracting the diffuse reverberation components.

Figure 7:
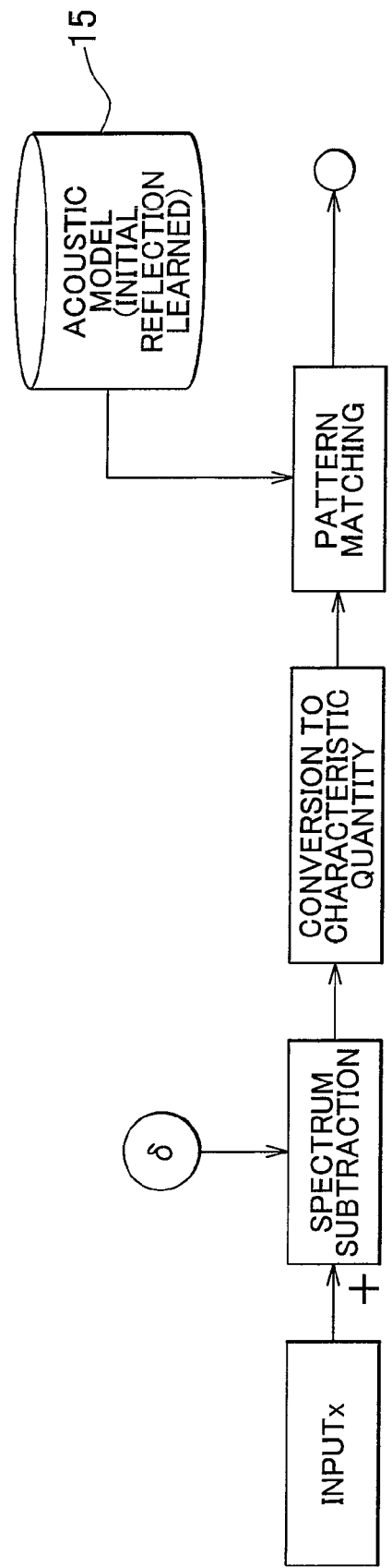
FIG. 7 is a view illustrating a speech recognition procedure executed in the speech recognition system of the example embodiment of the invention.

Next, an online speech recognition procedure will be described with reference to FIG. 1 and FIG. 7. The procedure illustrated in FIG. 7 is a procedure for speech recognition. First, the speech captured by the microphone 1 is input to the speech recognition device 2. In FIG. 7, the input x represents the input speech. Then, the spectrum transformation portion 31 transforms the input x into spectrum data. More specifically, time-domain data is transformed into frequency-domain data through FFT, or the like. Before transforming the input x into spectrum data, the spectrum transformation portion 31 performs framing on the input x in accordance the analysis frame length and the frame shift mentioned above.

The spectrum subtraction portion 32 subtracts the diffuse reverberation components from the spectrum data using the filter δ. Through this spectrum subtraction using the filter δ, the influences of the diffuse reverberation components are removed from the speech signals. Then, the speech is recognized based on the data obtained by subtracting the diffuse reverberation components from the spectrum data (subtraction data) as described below.

The speech recognition characteristic quantity conversion portion 33 converts the spectrum data into characteristic quantities for speech recognition. More specifically, the speech recognition characteristic quantity conversion portion 33 extracts characteristic quantities based on the subtraction data that has been obtained by subtracting the diffuse reverberation components. The characteristic quantities are, for example, 12th-order MFCC. In this case, filter bank analysis is performed using a mel-filter, and then logarithmic conversion (Log conversion) is performed and discrete cosine transform (DCT) is performed, whereby MFCC is calculated. In this example embodiment, as mentioned above, a 25th-order characteristic-quantity vector including the first-order difference of the MFCC and the first-order difference of power is calculated.

Using an MFCC as a characteristic quantity for speech recognition improves the speech recognition rate. That is, although it is true that non-linear processing such as spectrum subtraction may cause distortion when the signals are reformed back into speech signals, in a case where the signals are transformed into MFCCs, it causes no such problems. That is, because the spectrum data free of the diffuse reverberation components can be directly transformed into MFCCs, not speech signals, distortion can be prevented.

The pattern-matching portion 34 performs pattern matching on the characteristic-quantity vector of the acoustic model 15. By doing so, the pattern-matching portion 34 recognizes phonemes having patterns closest to the characteristic-quantity vector of the captured speech signals. That is, the pattern-matching portion 34 serves as a speech-recognition portion that performs speech recognition by referring to the acoustic model 15.

As such, the acoustic model 15 is changed based on the initial reflection components, and therefore the acoustic model 15 is appropriate. Further, because the initial reflection components free of the diffuse reverberation components (high-order reflection components) that causes influences beyond the analysis lengths for learning are used for learning, accurate phonologic learning can be performed. Further, because the influences of the initial reflection components can be absorbed through HMM learning, the speech recognition rate improves.

Further, because the diffuse reverberation components are used for the filter δ for the spectrum subtraction, the diffuse reverberation components can be removed from the input speech. As such, the influences of the diffuse reverberation components to the input speech can be removed. As such, the influences of the diffuse reverberation components can be reduced, and therefore the speech recognition rate improves.

In this example embodiment, an impulse response is measured in an environment that is identical to the environment in which speech signals for speech recognition are actually obtained, and initial reflection components and diffuse reverberation components are extracted from the reverberation pattern of the measured impulse response. In this case, the impulse response measurement is performed in the room in which the microphone 1 is set. The reverberation of the room and the shapes around the microphone 1 can be considered to remain substantially unchanged unless a significant change, such as using a different room, has been made. Therefore, it can be considered that, regardless of what the direct sound is, the obtained diffuse reverberation components are substantially constant unless the environment has been changed. That is, the diffuse reverberation components are substantially constant regardless of the uttered speech (voice). The initial reflection components and the diffuse reverberation components can be separately estimated by detecting the reverberations of the impulse response in the room only once after determining the method for setting the microphone 1 in position.

More specifically, the impulse response is first measured in the room, and then initial reflection components and diffuse reverberation components are extracted from the measured impulse response. Then, the acoustic model 15 reflecting the initial reflection components and the filer 5 created based on the diffuse reverberation components are repeatedly used for speech recognition in the environment. That is, the same filter δ and the same acoustic model 15 are used for the speech signals captured in the same environment. Further, because it is sufficient to detect an impulse response only one time in advance, the learning of the acoustic model 15 and the creation of the filter δ are easy. Further, because the acoustic model 15 and the filter δ are prepared in advance, the amount of online processing can be reduced. As such, a high speech recognition rate can be achieved by a simple procedure.

When the environment has changed due to, for example, the speaker 5 having moved to other room, the impulse response measurement is performed once in the new environment. Then, the acoustic model 15 is learned and the filter δ is created through the same processes as described above. That is, performing the model learning and the filter creation in each environment improves the speech recognition rate. Further, when the microphone 1 has been replaced with a new microphone 1, the impulse response measurement is performed with the new microphone 1 and the above-described processes are performed. The environments for speech recognition are not limited to rooms, but they include various other environments, such as vehicle compartments, outdoors, and so on. For example, the speech recognition system may be incorporated in a car navigation system.

Note that the acoustic model 15 may be an acoustic model other than HMM. That is, the initial reflection components may be used to learn the acoustic model 15 even if it is not an HMM. Further, because it is possible to remove reverberations by one microphone 1, the system structure can be simplified.

Further, the respective processes may be executed using different computers. For example, the computer for the acoustic model learning and the filter creation and the computer for the speech recognition may be physically different from each other. In this case, that is, the online processes and the offline processes are executed by the different computers.

More specifically, the acoustic model 15 and the filter δ are created in advance using a processing unit incorporating the initial reflection component extraction portion 11, the convolution portion 12, the speech learning database 13, the acoustic-model learning portion 14, the diffuse reverberation component extraction portion 21, the spectrum transformation portion 22, and the filter creation portion 23. Then, the created acoustic model 15 and filter δ are stored in a speech recognition unit incorporating the spectrum transformation portion 31, the spectrum subtraction portion 32, the speech recognition characteristic quantity conversion portion 33, and the pattern-matching portion 34. Then, speech signals are captured using the microphone 1 connected to the speech recognition device 2, and the above-described processes are executed on the captured speech signals. In this case, too, a high speech recognition rate can be easily achieved. Alternatively, a computer for performing the speech recognition and a computer for storing the acoustic model 15 and the filter δ may be different from each other.

Further, the acoustic model learning and the filter creation may be performed using physically different computers. Further, the filter creation and the acoustic model learning may be performed using the results of measurements of different impulse responses. That is, the initial reflection components and the diffuse reverberation components may be extracted from different impulse responses. For example, two impulse responses are measured, and the initial reflection components are extracted from the first impulse response, and the diffuse reverberation components are extracted from the second impulse response. The above-described speech recognition system may be incorporated in an audio-response type robot. In this case, the response precision of the robot improves. In a case where speech signals of a continuous speech are input, speech recognition may be performed using language models.

What is claimed is:

1. A processing unit that executes processing for speech recognition, said processing unit comprising:
   a processor programmed to comprise:
      an initial reflection component extraction portion that extracts initial reflection components by removing diffuse reverberation components from a reverberation pattern of an impulse response generated in an environment;
      an acoustic model learning portion that learns an acoustic model for the speech recognition by reflecting the initial reflection components to speech data for learning;
      a diffuse reverberation component extraction portion that extracts an approximated diffuse reverberation components from the reverberation pattern of the impulse response generated in the environment; and
      a filter creation portion that creates a filter parameter for every input speech for subtracting approximated spectrum components of the diffuse reverberation components.

2. The processing unit according to claim 1, wherein the processor is further programmed to comprise:
   a recognition portion that executes a recognition process for the speech recognition by referring to the acoustic model, wherein
   the filter parameter is repeatedly used for the speech recognition.

3. The processing unit according to claim 1, wherein:
   a decay time border that is a time border between the initial reflection components and the diffuse reverberation components is set in accordance with an analysis length of the acoustic model; and
   components extracted from the reverberation pattern before the decay time border are classified as the initial reflection components, and components extracted from the reverberation pattern after the decay time border are classified as the diffuse reverberation components.

4. A speech recognition apparatus that performs speech recognition on speech signals captured by a microphone for capturing sounds uttered in an environment, said speech recognition apparatus comprising:
   a processor programmed to comprise:
      a spectrum transformation portion that transforms the speech signals captured by the microphone into spectrum data;
      a recognition portion that recognizes speeches from characteristic quantities corresponding to the spectrum data using an acoustic model changed by initial reflection components that are obtained by removing diffuse reverberation components from a reverberation pattern of an impulse response generated in the environment;
      a spectrum subtraction portion that subtracts approximated spectrum components of the diffuse reverberation components from spectrum data of the speech signals using a filter parameter for every input speech, wherein
      the recognition portion recognizes speeches based on subtraction data that is obtained by the spectrum subtraction portion subtracting the approximated spectrum components of the diffuse reverberation components from the spectrum data of the speech signals.

5. The speech recognition apparatus according to claim 4, wherein the filter parameter is repeatedly used for the speech recognition in the same environment.

6. A speech recognition system that has a microphone for capturing sounds uttered in an environment and having a processor that performs speech recognition on speech signals captured by the microphone, said speech recognition apparatus comprising:
   a processor programmed to comprise:
      a spectrum transformation portion that transforms the speech signals captured by the microphone into spectrum data; and
      a recognition portion that recognizes speeches from characteristic quantities corresponding to the spectrum data using an acoustic model changed by initial reflection components that are obtained by removing diffuse reverberation components from a reverberation pattern of an impulse response generated in the environment;
      a spectrum subtraction portion that subtracts approximated spectrum components of the diffuse reverberation components from spectrum data of the speech signals using a filter parameter for every input speech, wherein
      the recognition portion recognizes speeches based on subtraction data that is obtained by the spectrum subtraction portion subtracting the approximated spectrum components of the diffuse reverberation components from the spectrum data of the speech signals.

7. A speech recognition method for performing speech recognition on speech signals captured by a microphone for capturing sounds uttered in an environment, comprising:

programming a processor to execute a computation, wherein said computation includes:
- extracting initial reflection components by removing diffuse reverberation components from a reverberation pattern of an impulse response generated in the environment;
- learning an acoustic model for the speech recognition by reflecting the initial reflection components to speech data for learning;
- extracting approximated diffuse reverberation components from the reverberation pattern of the impulse response generated in the environment; and
- creating a filter parameter for every input speech for subtracting approximated spectrum components of the diffuse reverberation components, wherein the speech recognition is performed based on subtraction data that is obtained by subtracting the approximated spectrum components of the diffuse reverberation components from the speech signals using the filter parameter.

8. The speech recognition method according to claim 7, wherein:
- the speech recognition is performed by referring to the acoustic model; and
- the filter parameter is repeatedly used for the speech recognition.

9. The speech recognition method according to claim 7, wherein:
- a decay time border that is a time border between the initial reflection components and the diffuse reverberation components is set in accordance with an analysis length of the acoustic model; and
- components extracted from the reverberation pattern before the decay time border are classified as the initial reflection components, and components extracted from the reverberation pattern after the decay time border are classified as the diffuse reverberation components.

10. A non-transitory storage medium storing a speech recognition program for performing speech recognition on speech signals captured by a microphone for capturing sounds uttered in an environment, comprising:
- an instruction for causing a computer to capture a reference sound uttered in the environment and extract initial reflection components from a reverberation pattern of the reference sound; and
- an instruction for causing the computer to learn an acoustic model for the speech recognition by reflecting the initial reflection components to speech data for learning;
- an instruction for extracting approximated diffuse reverberation components from the reverberation pattern of the impulse response generated in the environment; and
- an instruction for creating a filter parameter for every input speech for subtracting approximated spectrum components of the diffuse reverberation components, wherein
- the speech recognition is performed based on subtraction data that is obtained by subtracting the approximated spectrum components of the diffuse reverberation components from the speech signals using the filter parameter.

11. The storage medium according to claim 10, wherein:
- the speech recognition is performed by referring to the acoustic model; and
- the filter parameter is repeatedly used for the speech recognition.

12. The storage medium according to claim 10, wherein:
- a decay time border that is a time border between the initial reflection components and the diffuse reverberation components is set in accordance with an analysis length of the acoustic model; and
- components extracted from the reverberation pattern before the decay time border are classified as the initial reflection components, and components extracted from the reverberation pattern after the decay time border are classified as the diffuse reverberation components.

* * * * *